United States Patent [19]
Krug et al.

[11] Patent Number: 6,088,423
[45] Date of Patent: Jul. 11, 2000

[54] MULTIVIEW X-RAY BASED SYSTEM FOR DETECTING CONTRABAND SUCH AS IN BAGGAGE

[75] Inventors: Kristoph D. Krug, Framingham; John O. Tortora; Richard Bijjani, both of Westford; Richard F. Eilbert, Lincoln, all of Mass.

[73] Assignee: Vivid Technologies, Inc., Woburn, Mass.

[21] Appl. No.: 09/092,295

[22] Filed: Jun. 5, 1998

[51] Int. Cl.⁷ .................................................. G01N 23/04
[52] U.S. Cl. ................................... 378/57; 378/4; 378/9; 378/51
[58] Field of Search ................................ 378/57, 51, 69, 378/9, 4

[56] References Cited

U.S. PATENT DOCUMENTS

| | | | |
|---|---|---|---|
| 4,366,382 | 12/1982 | Kotowski | 378/57 |
| 4,686,695 | 8/1987 | Macovski | 378/146 |
| 5,125,015 | 6/1992 | Shimoni et al. | 378/51 |

(List continued on next page.)

OTHER PUBLICATIONS

J. Ross Stenstrom, et al., Constructing Object Models from Multiple Images, vol. 9:3, pp. 185–212, (1992) Kluwer Academic Publishers.

Ralph Benjamin, Object–Based 3D X–Ray Imaging For Second–On Line Screening, pp. 310–313, (1995) European Convention on Security and Detection, Conf. Publication No. 408.

R. Benjamin, et al., Extraction and use of X–ray specific density following object–based three–dimensional reconstruction, pp. 420–430, (1996) Medical & Biological Engineering & Computing.

Heikki Sipilä, Moving object computer tomography for luggage inspection, vol. 1824, pp. 39–40, (1992) Applications of Signal and Image Processing in Explosives Detection Systems.

Yves Trousset, et al., Multiscale Cone–Beam X–Ray Reconstruction, vol. 1231, pp. 229–237, (1990) Medical Imaging IV: Image Formation.

Yoram Bresler, et al., Model–Based Estimation Techniques for 3–D Reconstruction from Projections, vol. 1, pp. 115–126, (1988) Machine Vision and Applications.

C. Picard, et al., Quantitative 2D Dual Energy Imaging: Towards 3D Selective Reconstruction, Vo. 1231, pp. 218–228, (1990), Medical Imaging IV: Image Formation.

(List continued on next page.)

*Primary Examiner*—David P. Porta
*Assistant Examiner*—Allen C Ho
*Attorney, Agent, or Firm*—Cooper & Dunham LLP

[57] ABSTRACT

A multiview X-ray based inspection system detects contraband such as explosives, weapons, drugs and money in packages such as baggage. Each bag moves through at least three stationary, fan-shaped beams of x-rays that are in parallel planes spaced from each other in the direction of bag travel, to produce three projection views of the bag taken from different angles. These projection views are processed to extract two-dimensional outlines of likely individual objects in the bag, and the two-dimensional outlines are matched between different projection views to extract three-dimensional outlines of likely objects in the bag. The system uses these three-dimensional outlines to estimate effective atomic numbers and mass densities of material in these objects, and then to determine the presence of likely contraband in the baggage by testing these estimates against windows in a multi-dimensional space in which one dimension is effective atomic number and another is mass density. The typical windows correspond to known contraband materials. The system can derive measurements from additional modalities such as nuclear quadrupole resonance (NQR) for use in conjunction with the x-ray measurements in finding likely contraband.

27 Claims, 8 Drawing Sheets

U.S. PATENT DOCUMENTS

| | | | |
|---|---|---|---|
| 5,175,756 | 12/1992 | Pongratz et al. | 378/88 |
| 5,182,764 | 1/1993 | Peschmann et al. | 378/57 |
| 5,319,547 | 6/1994 | Krug et al. | 364/409 |
| 5,379,334 | 1/1995 | Zimmer et al. | 378/98.2 |
| 5,442,672 | 8/1995 | Bjorkholm et al. | 378/4 |
| 5,457,385 | 10/1995 | Sydney et al. | 324/300 |
| 5,479,023 | 12/1995 | Bartle | 250/390.04 |
| 5,490,218 | 2/1996 | Krug et al. | 382/100 |
| 5,491,414 | 2/1996 | Smith et al. | 324/307 |
| 5,583,437 | 12/1996 | Smith et al. | 324/307 |
| 5,600,303 | 2/1997 | Husseiny et al. | 340/568 |
| 5,600,700 | 2/1997 | Krug et al. | 378/57 |
| 5,608,321 | 3/1997 | Garroway et al. | 324/307 |
| 5,642,393 | 6/1997 | Krug et al. | 378/57 |
| 5,647,018 | 7/1997 | Benjamin | 382/128 |
| 5,692,028 | 11/1997 | Geus et al. | 378/57 |
| 5,692,029 | 11/1997 | Husseiny et al. | 378/88 |
| 5,796,802 | 8/1998 | Gordon | 378/8 |
| 5,966,422 | 10/1999 | Dafni et al. | 378/9 |
| 5,974,111 | 10/1999 | Krug et al. | 378/57 |
| 6,018,562 | 1/2000 | Wilson | 378/9 |

OTHER PUBLICATIONS

C. Smets, et al., A Knowledge–based system for the 3D reconstruction and representation of the ceberal blood vessels from a pair of stereoscopic angiograms, vol. 1092, pp. 130–138, (1989), Medical Imaging III: Image Processing.

Jeffrey Fessler, et al., 3–D Reconstruction of Vessels with Stenoses and Aneurysms from Dual Bi–Plane Angiograms, vol. 1092, pp. 22–32, (1989), Medical Imaging III: Image Processing.

F. Peyrin, et al., 3D Reconstruction from cone beam projection by a bloc iterative technic, vol. 1443, pp. 268–279, (1991), Medical Imaging V: Image Physics.

Anders H. Andersen, Algebraic Reconstruction in CT from Limited Views, vol.8, No.1, pp. 50–55, (1989) IEEE Transactions on Medical Imaging.

P. Oskoui, et al., A Comparative Study of Three Reconstruction Methods for a Limited View Computer Tomography Problem, vol. 8, No. 1, pp. 43–49, (1989) IEEE Transactions on Medical Imaging.

A. Rougee, et al., Comparison of 3–D Tomographic Algorithms For Vascular Reconstruction, vol. 914, pp. 397–405, (1988), Medical Imaging II.

P. Suetens, et al., Knowledge–based blood vessel delineation on DSA images, vol. 914, pp. 406–411, (1988), Medeical Imaging II.

Kenneth M. Hanson, Limited Angle CT Reconstructions Using a Priori Information, pp. 527–533 (1982) Proceedings ISMIII '92, First IEEE Computer Society International Symposium on Medical Imaging and Image Interpretation.

Jiang Wu, et al., Three–dimensional reconstruction of coronary arteries using more than two projections, vol. 1233, pp. 77–84, (1990) Medical Imaging IV: Image Processing.

Didier Saint–Felix, et al., 3D Reconstruction Of High Contrast Objects Using a Multi–scale Detection/Estimation Scheme, vol. F 60, pp. 147–171, (1990) NATO ASI Series, 3D Imaging in Medicine.

MULTIVIEW X-RAY BASED SYSTEM FOR DETECTING CONTRABAND SUCH AS IN BAGGAGE

BACKGROUND

X-ray baggage inspection systems are used at airports and other controlled access facilities, for example to look for contraband in checked or hand luggage and other packages. At an airport, the bags typically move on a conveyor belt through an x-ray beam and an operator looks at the resulting image and other information to spot contraband. The assignee of this invention Vivid Technologies, Inc. ("Vivid") markets dual-energy x-ray baggage inspection systems that use differences in the response of materials to different x-ray energy ranges and further use various signal processing techniques to identify individual objects in a bag and to derive information regarding the effective atomic number and other information for such individual objects and thus assess the likely presence of contraband materials. Some systems measure only transmitted x-rays while others measure scattered radiation as well. Vivid offers such systems under trade names such as VIS or VDS, and is the assignee of U.S. Pat. No. 5,319,547 (Krug, et al.), U.S. Pat. No. 5,490,218 (Krug, et al.), U.S. Pat. No. 5,600,700 (Krug, et al.) and U.S. Pat. No. 5,642,393 (Krug, et al.), which are hereby incorporated by reference into this disclosure as though fully set forth herein. Other modalities also have been proposed or used in connection with seeking to detect contraband in baggage and other packages, such as single-energy computerized tomography (CT) to find the density of materials, dual-energy CT to find the effective atomic number as well, vapor analysis seeking to detect traces of chemicals associated with contraband, thermal neutron technology, and nuclear quadrupole resonance (NQR) technology. See, for example, U.S. Pat. No. 4,686,695 (Macovski), U.S. Pat. No. 5,647,018 (Benjamin), U.S. Pat. No. 5,182,764 (Peschman, et al.), U.S. Pat. No. 5,692,028 (Geus, et al.), U.S. Pat. No. 5,379,334 (Zimmer, et al.), U.S. Pat. No. 4,366,382 (Kotowski), U.S. Pat. No. 5,692,029 (Husseiny, et al.), U.S. Pat. No. 5,600,303 (Husseiny, et al.), and U.S. Pat. No. 5,442,672 (Bjorkholm, et al.), U.S. Pat. No. 5,608,321 (Garroway, et al.), U.S. Pat. No. 5,457,385 (Sidney, et al.), U.S. Pat. No. 5,491,414 (Smith, et al.), and U.S. Pat. No. 5,583,437 (Smith, et al.). All of the patents identified above are hereby incorporated by reference into this disclosure. In addition to the equipment sold by Vivid Technologies, Inc., equipment for detection of contraband has been offered by companies such as, e.g., Heimann Systems of Frankfurt, Germany, Rapiscan Security Systems of Long Beach, California, InVision Technologies, Inc. of Foster City, Calif., and EG&G Astrophysics, Inc. of Long Beach, Calif.

It is believed that existing baggage inspection systems meet some but not all of the inspection needs, such as a high throughput rate for efficient passenger baggage handling, high detection rate to increase the likelihood of finding contraband, and a low false alarm rate to reduce the need for additional time and resources in further checking of suspicious bags. In the case of checked baggage, some airports use several levels of checked luggage inspection. For example, a level 1 station uses an automated x-ray system which inspects luggage at a high rate such as over 1000 bags per hour but has relatively high false alarm rate such as from 10% to 50%. A bag that cannot be cleared at a level 1 station is diverted to a level 2 station, where typically an operator examines an x-ray image of the bag and looks for shapes that may suggest contraband such as detonation devices, wires, weapons or other suspicious objects. A bag that is not cleared at level 2 typically goes to a level 3 station where it is subjected to a more stringent examination. While such equipment and procedures can give satisfactory performance, a need still remains to speed up inspection while maintaining or increasing the detection rate and maintaining or decreasing the false alarm rate. This disclosure describes a system and a method directed toward meeting that need.

SUMMARY

The system and method described herein are directed to finding likely contraband such as explosives in baggage but are applicable to finding other contraband as well and to inspecting items other than luggage such as, without limitation, other packages, mail, or products. The system and method are applicable to finding both military and commercial explosives such as C4, RDX, Semtex, Seismoplast, PE4, TNT, dynamite, PETN, ANFO, as well as smokeless and black powder, and also to finding other contraband such as drugs and currency. The disclosed system and method can use transmitted x-ray measurements alone or in combination with scattered x-rays and/or information from other modalities such as NQR.

A non-limiting example is embodied in a detection system that uses three parallel, stationary fan beams of x-rays. The beams traverse an enclosed tunnel and are spaced from each other in the tunnel along the direction in which baggage moves through the tunnel on a conveyor belt, typically moves at a constant linear speed, without rotation or other movement of the baggage relative to the x-ray beams. Suitable collimation directs each fan-shaped x-ray beam to a respective L-shaped array of x-ray detector elements extending along two adjacent walls of the tunnel. The source of one of the x-ray beams is under the left corner of the tunnel, the source of another is under the right corner, and the source of the third is at the side of the tunnel, such that the three beams are at an angle to each other. As the baggage moves through a beam, the outputs of detector elements receiving that beam are interrogated to produce lines of x-ray attenuation data. A set of these parallel lines forms a respective projection view for each of the three fan beams. If desired, radiation scattered by the baggage is detected as well, for one or two or all three of the beams, to produce scatter data. This data acquisition is similar to the data acquisition described in the Vivid patents cited above, except that in this case the process is carried out individually for each of the three x-ray beams to thereby generate three projection views for each bag and, if desired, one or more sets of scatter data as well. Applicants have found that using three projection views provides just enough x-ray data to produce sufficiently accurate estimates of atomic number and/or density, unlike systems which use only two x-ray beams, while at the same time minimizing the number of beams and thus eliminating the cost and complexity of using more than three sets of an x-ray source and detector array each, or the cost and other expense of using a rotating x-ray source as in conventional CT systems.

As in the earlier-cited Vivid patents, the non-limiting example described in detail below makes use of the expectation that for a given substance the ratio of the attenuation of two rays of different x-ray energies can yield a value called $Z_{eff}$ (Z effective) which can characterize the substance and can serve as an approximation or estimate of the average atomic number of the substance. Thus, every substance can be assigned a $Z_{eff}$ value, and an estimate of $Z_{eff}$ can be used to discriminate between different substances. If a substance is measured in isolation, $Z_{eff}$ can be estimated with high accuracy. However, the x-ray transmission image of a bag shows the superposition of all objects and all materials through which the x-rays pass. It is more useful to estimate $Z_{eff}$ of an individual object which is likely to be made of a homogenous material, but this can only be done if the object can be isolated from the clutter on top, under and around it in the bag so that the object's $Z_{eff}$ can be thought of as a unique characteristic of that object and not as an average of all of the objects through which the relevant x-rays have passed. As described in the earlier-cited Vivid patents, the measured attenuation values for pixels in the projection view of the high-energy and the low-energy x-ray beams can be mapped into a machine independent, hardening-corrected format in which any pair of attenuation values (high-energy and low-energy, or HL) is represented by the thickness of a given low-Z material such as Boron (B), plus the thickness of a given high-Z material such as Iron (I) that would produce the respective pair of attenuation values.

A process operating in accordance with the non-limiting example described in detail herein examines the attenuation measurements along, and if desired across, scan lines in each of the three projection views to find where the attenuation values change significantly, and identifies feature points at pixels where it finds such changes. In each of the three projection views, the feature points are likely to signify the start or end of a likely object as reflected in a given one of the scan lines (and, if desired, across the scan lines) in a given one of the three projection views. The process further finds respective tails for the feature points, one along the scan line to which the feature point belongs and another along the pixels resulting from the detector element that generated that feature point. A tail along a scan line is a line segment starting from the feature point where the line is likely to start entering an object to the feature point where the line is likely to be exiting the same object. A tail along a detector is another segment which starts at a feature point which is likely to be where that detector element first detects an object and stops at a feature point which is likely to be where that detector last detects the same object. The process can find other properties of feature points as well, such as delta-B (the difference in equivalent Boron thickness as between the feature point and a nearby background pixel), the gradient direction of changes in B, the background B, and an estimate of $Z_{eff}$ at the feature point, and can associate the tails and additional properties with the respective feature points. The process then attempts to chain feature points having compatible properties associated with them. Ideally, each chain would outline the two-dimensional projection of an individual object (such as a stick of dynamite) in a projection view, but the information available at this stage typically is not yet sufficient to do so well and all that can be said to a reasonable certainty at this stage of the process is that a chain of feature points may match the projection of a segment of the edge of a likely individual object in that view. A likely object can and should have one or more respective chains of feature points in each of the three projection views. The process then attempts to map feature points into tuples in three-dimensional space by examining feature points from pairs of projection views. Each pair of projection views selected from among the three possible pairs of projection views can produce respective tuples, where each tuple results from associating with each other a pair of feature points, one from each of the projection views in the pair of views, which have matching properties, i.e., associated properties which match significantly. Because each tuple results from information from two projection views taken from different angles, the tuple position can be identified in three-dimensional space, and three dimensional properties can be associated with the tuple. In addition, the properties of the feature points which generated the tuple can be associated with that tuple. While ideally the tuples would represent the outlines of individual objects in three-dimensional space, this may not always be the case at this stage of the process. In fact, typically there are too many tuples at this stage and typically at least some of them do not match the three-dimensional outlines of appropriate individual objects.

The process attempts to use the tuples to identify three-dimensional outlines of likely objects in the bag through examining tuples in slice views through the bag (e.g., views that are normal to the direction of travel of the bags and are parallel to the planes of the fan-shaped beams of x-rays), which slice views are synthesized from the scan lines that produced the projection views. The process examines tuples in a slice view in an effort to connect into chains tuples which have matching properties, and to thus create chains of tuples first in respective slice views and then in three-dimensional space, to thereby produce likely three-dimensional outlines (skeletons) for respective individual objects in the bag. In this stage of the process, an effort is made to approximate the shape of an individual object in each slice view by iteratively checking an assumed shape of the object in a slice view against the actual attenuation profile relative to background measured for that object by each of the three beams in the scan lines in the plane of the slice. The result of that process is a refined estimate of the shape of the polygon that outlines an object in each slice. This involves iteratively adjusting the shapes of polygons that represent the outlines of likely objects in the slice view, in accordance with the measured attenuation profiles relative to background for each of the three projection views used to produce that slice view. To accomplish this shape adjustment, the polygon can be modeled as a series of ray segments, one for each detector subtended by the polygon, for a single chosen view. The length of each ray segment is proportional to the attenuation for this ray relative to background seen by the corresponding detector. The shape adjustment procedure iteratively adjusts the position and length of these ray segments, or tines, in order to best fit the attenuation data in all views. In order to speed up this operation, the process can make this adjustment for only a subset of the tines (called control tines) in the polygons, and then adjust other, non-control tines based on this adjustment of the subset of control tines. The process carries out a similar tine adjustment for each available slice view and accepts the resulting polygons with adjusted positions of their vertices as representing the outlines or skeletons of likely individual objects in the bag. The computed attenuation values of, for example, control tines that are at the middle between two adjacent vertices of the polygon, are compared with measured attenuation values, and the remaining, non-control tines in the polygon are adjusted depending on the adjustment of those control tines. The process further attempts to chain these polygons, based on similarities between their properties, into three-dimensional outlines ol the individual objects (called skeletons) and then to estimate the $Z_{eff}$ (or alpha) and the mass density of each individual object, in order to remove the effects of other objects to the extent practical. For each object, the process estimates an effective atomic number by finding the ratio of the Iron value I to the sum of the Boron value B and the Iron value I (i.e., $\{(I/(B+I)\}$ for the pixels in each of the three projection views which match the position of the skeleton, averages the results from the two views which are closest to each other and discards the result for the remaining projection view to produce an estimated atomic number for that likely object. To estimate the mass (electron) density of a likely object, for each scan line through the object in each of the three projection views, the process calculates the value $\{(B_{object+background}-B_{background})/\text{length}\}$, where $B_{object+background}$ means the sum of the attenuation of voxels along a line segment in the object, $B_{background}$ means the estimated attenuation of the object's background, and length means the estimated length of the ray segments through the object. Each object's $Z_{eff}$ (or alpha) and mass density estimates are tested against windows in multi-dimensional space (such as space defined by the dimensions $Z_{eff}$ and density) that are known to correspond to specified contraband materials, to thereby check for the likely presence of such materials in the bag.

Alternatively, each of the two-dimensional projection views can be segmented into regions each containing similar contiguous pixels that share a common boundary and thus are likely to belong to the same object in the bag. These regions or "clumps (of regions)" then represent significant pieces of, or even entire, objects in each projection view. The boundaries of these clumps represent significant changes in x-ray attenuation and usually represent the boundaries of the objects to be reconstructed. These regions or clumps are then matched up from one projection view to another using various properties such as the x-ray data (e.g., Boron attenuation, $Z_{eff}$, starting or ending on the same scan line, mass over background, shape), as well as—if desired—other suitable properties or parameters. Once matched in this manner, the regions or clumps provide the location of the begin and end points on each line as well as associating a series of points (on multiple lines) with an individual object (corresponding to the feature point chains discussed elsewhere). Now tuple chains can be constructed and automatically associated with an individual object, as distinguished from constructing objects out of polygons that coincide in three-dimensional space. At this point the alternative process proceeds to the polygon shape adjusting method using tines, as described elsewhere in this disclosure, and to the rest of the process described in this disclosure.

In addition, scattered radiation can be measured, for example as discussed in Vivid U.S. Pat. No. 5,600,700 as an aid to finding suspicious objects in bags. Still in addition, a modality such as NQR can be used as an aid to identify suspicious bags. In each case, a suspicious bag is a bag which is likely to contain contraband. The system can estimate the size of the bag, for example by using the three x-ray projection views or by using an optical system, and can use the size information to refine the estimates used for feature points and tuples and, ultimately, for checking for contraband.

DETAILED DESCRIPTION

Figure 1:
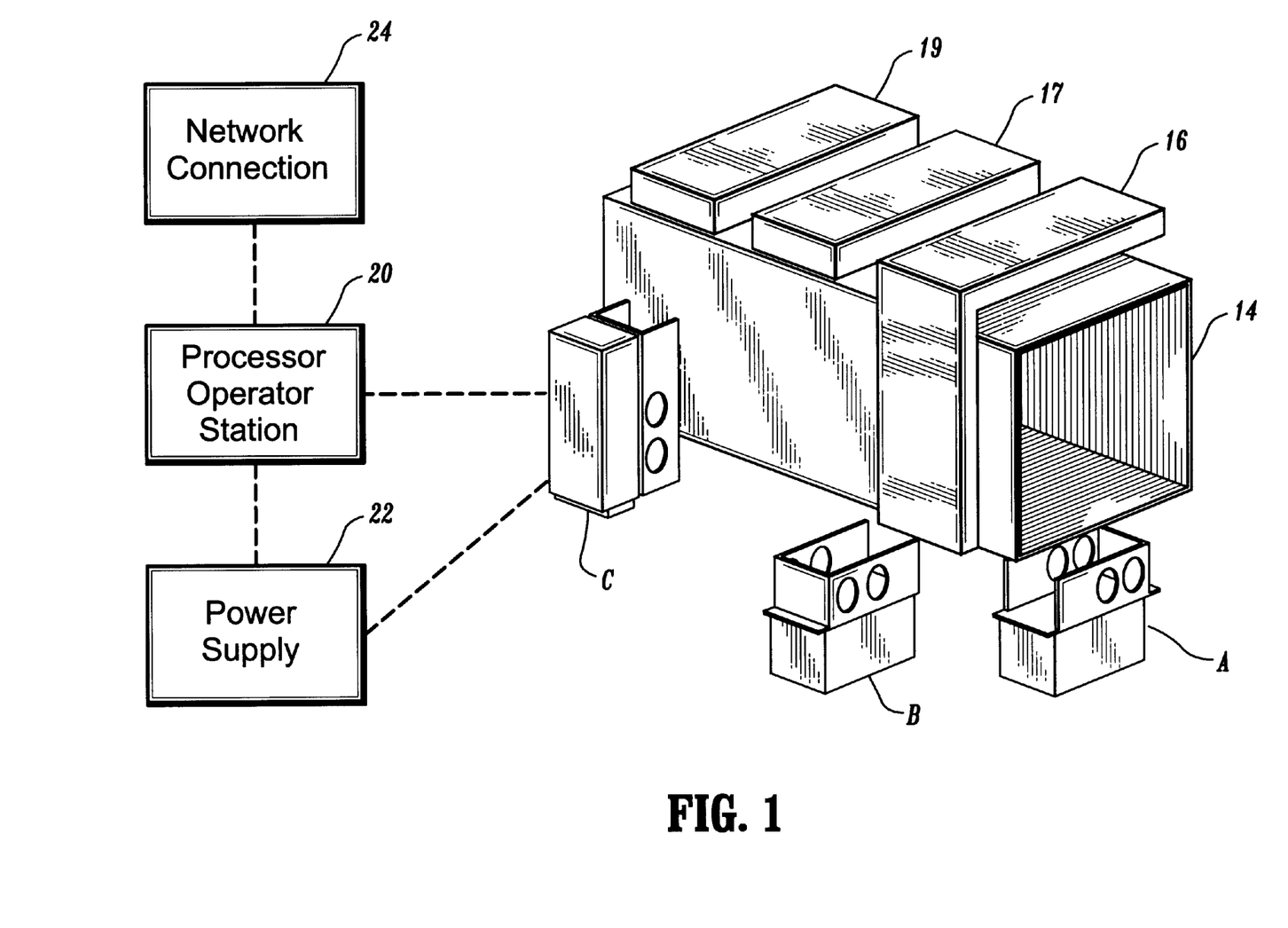
FIG. 1 is a partial perspective view illustrating a tunnel and three sets of an x-ray source and an L-shaped detector each.
Figure 2:
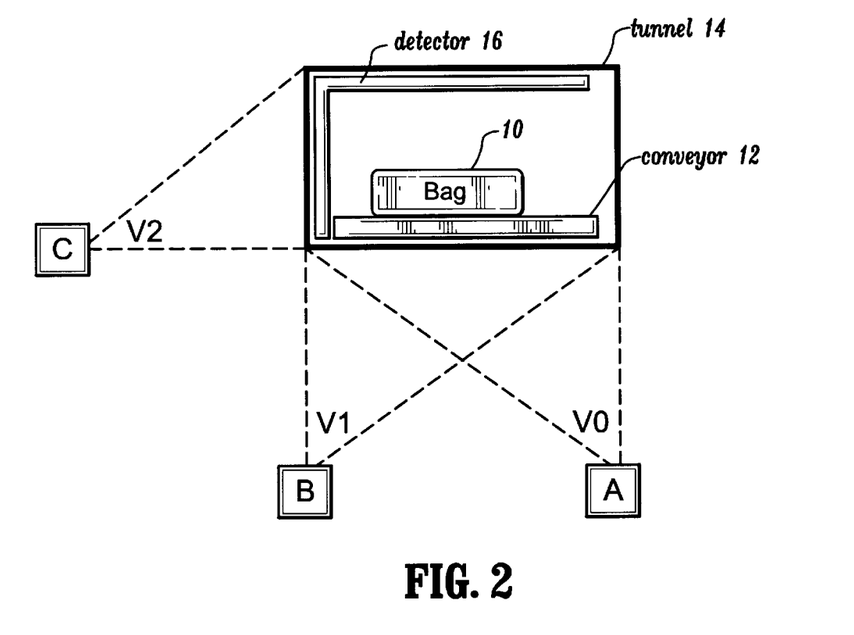
FIG. 2 is a view into the tunnel illustrating the sources and detectors and their respective fan-shaped x-ray beams, as well as a bag and a conveyor belt.
Figure 3:
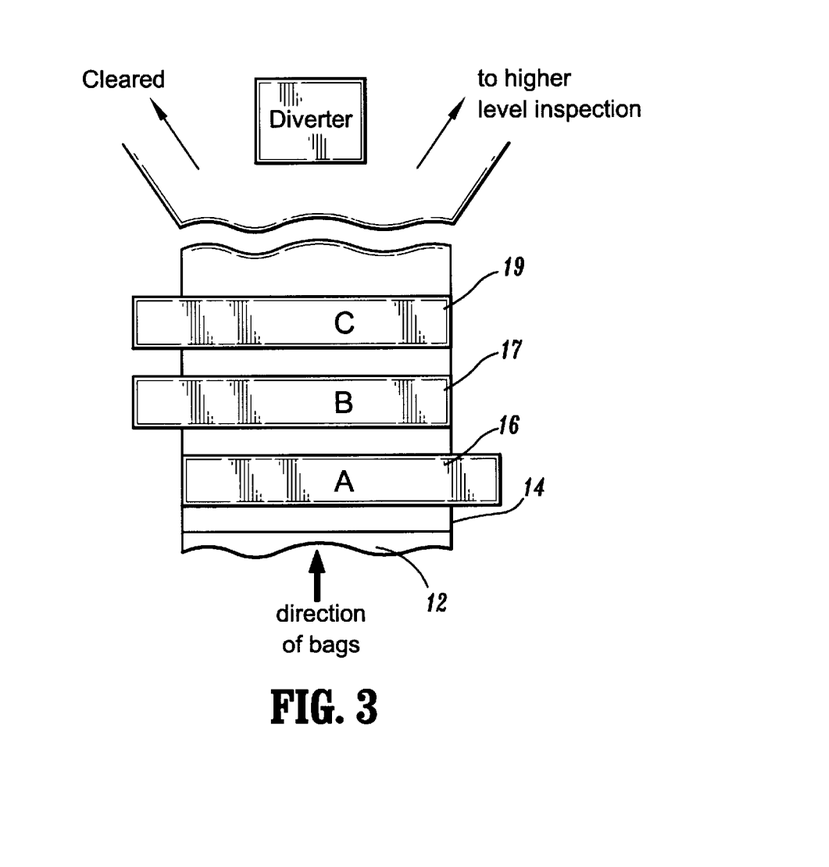
FIG. 3 is a top view illustrating the sources and detectors and a portion of the tunnel and of the conveyor belt.

Referring to FIGS. 1–3, an X-ray inspection system embodying a non-limiting example of the disclosure herein comprises x-ray sources A, B and C that produce respective fan-shaped x-ray beams V0, V1 and V2. Each beam conforms to a respective plane, and the three planes that are parallel to each other and are spaced from each other in the direction of movement of bags 10 (see arrow in FIG. 3) on a conveyor belt 12 moving through a tunnel 14. Each of beams V0, V1 and V2 is directed to a respective L-shaped detector array, of which only detector array 16 for source A is illustrated in full in FIGS. 1 and 2. Detector arrays 17 and 19, for sources B and C respectively, are similar but are positioned differently in accordance with the positions of sources B and C so as to receive x-ray beams V1 and V2 respectively. In addition, one or more scattered radiation detector arrays with appropriate collimation can be used for one or more of beams V0, V1 and V2, such as a respective forward scatter detector array and/or back scatter detector array for each of the beams. Each of sources A, B, and C can be similar to the source disclosed in Vivid U.S. Pat. No. 5,600,700 and each can be associated with a respective transmitted radiation detector array and, if desired, with scattered radiation detector array as disclosed in the same Vivid patent. A processor/operator station 20 is coupled with the source/detector units to receive and process x-ray measurements from the x-ray detectors and to control the operation of the units and provide operator interface, and a suitable power source 22 provides the power needed for operation. In addition, a network connection 24 can be provided to interface the disclosed units with other similar units or with other workstations and other equipments for the exchange of information.

Figure 4A:
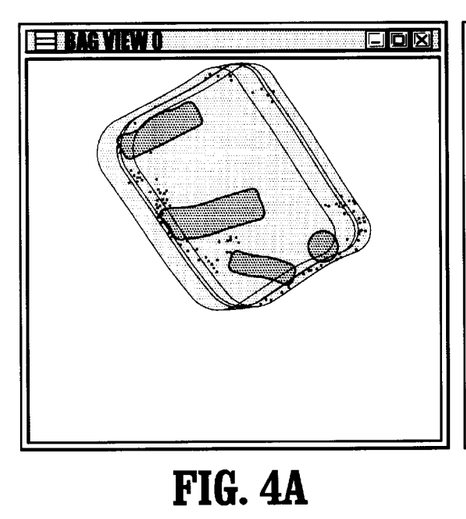
FIGS. 4a, 4b and 4c illustrate three projection views of a bag.
Figure 4B:
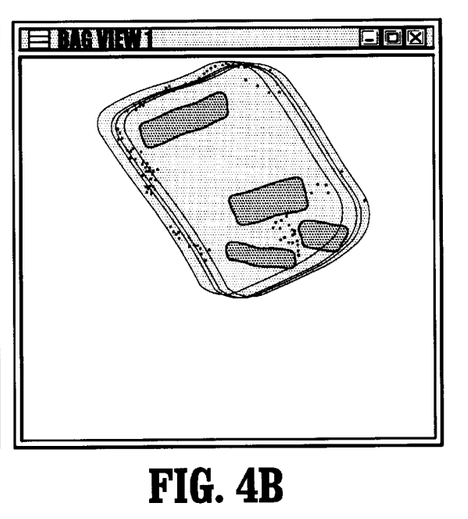
Figure 4C:
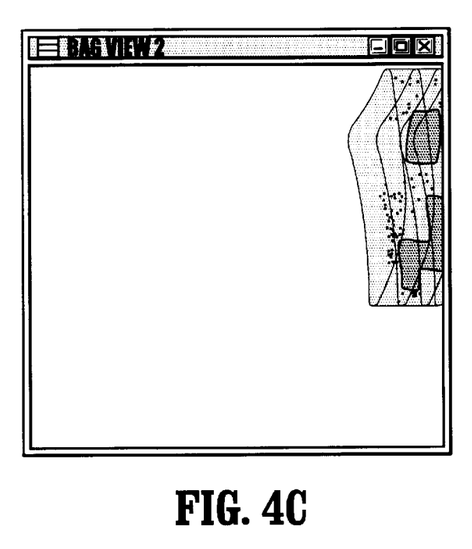

The passage of a bag 10 through a fan beam produces a set of parallel scan lines at which x-ray attenuation data is measured, where each scan line includes respective x-ray data for each of the two x-ray energies (or energy ranges) for a number of points that typically equals the number of detector elements in the detector array. The set of scan lines for one of the fan beams forms a respective projection view of the bag. FIGS. 4a, 4b and 4c illustrate the three projection views of a sample bag 10 resulting from passing the bag through the apparatus of FIG. 1. For ease of illustration, the bag contains only a few objects, including some which do not overlap in at least one of the projection views. Of course, a typical bag in an airport setting would be more cluttered, containing more objects and exhibiting more overlap. The process described herein attempts to identify and locate the individual objects despite the clutter and overlap in each projection view in order to examine the properties of individual objects in the bag for the likely presence of contraband.

Figure 5:
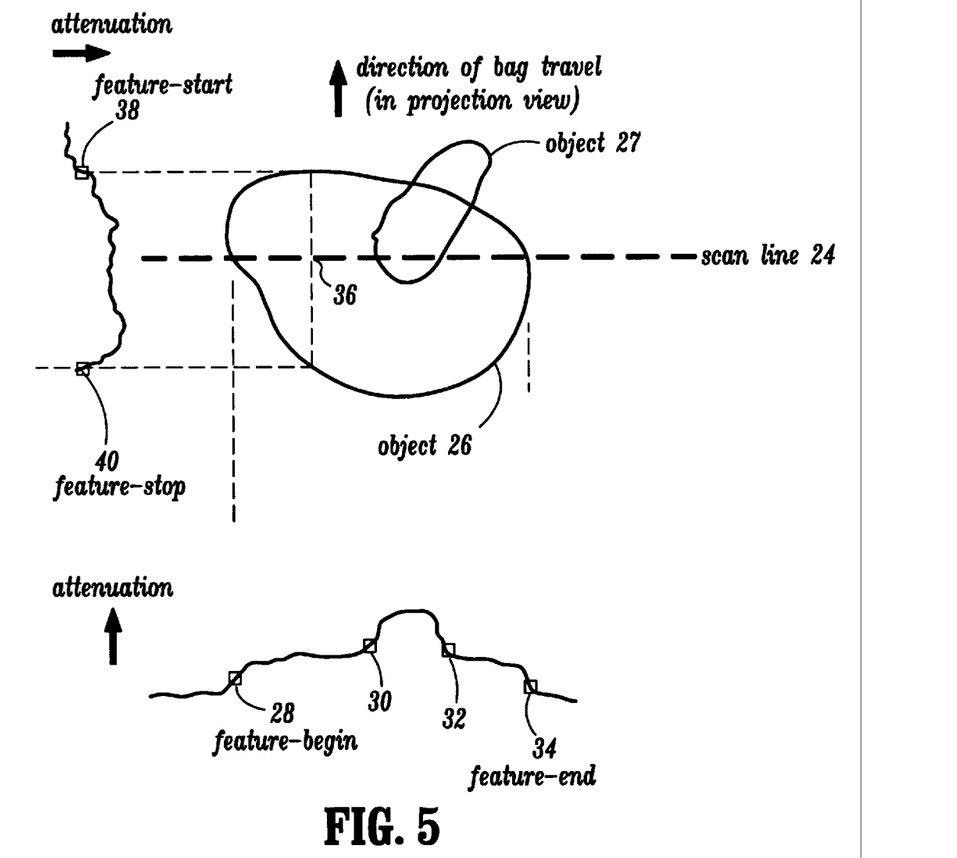
FIG. 5 illustrates a projection of two likely objects in a projection view.

To this end, the process examines the measured attenuation values along a scan line, looking for FEATURE_BEGIN and FEATURE_END POINTS, where a FEATURE_BEGIN point is characterized by a significant rise in attenuation and FEATURE_END point by a significant drop in attenuation. FIG. 5 illustrates a scan line 24 which is perpendicular to the direction in which a bag travels along conveyor 12. Scan line 24 intersects an object 26 seen in a projection view in FIG. 5. The measured x-ray attenuation of object 26 along scan line 24 is illustrated by the curve below the object, where the axis extending up denotes greater measured attenuation while the axis extending to the right denotes positions along the scan line, and points 28 and 30 are FEATURE_BEGIN points and points 32 and 34 are FEATURE_END points. Note that another object 27 overlaps in this example with object 26, such that points 28 and 34 denote the entry and exit of scan line 24 relative to object 26 but points 30 and 32 are due to the attenuation of object 27. In a similar manner, the process examines the attenuation measured at each detector element position, such as at detector element 36, i.e., in a direction across the scan lines, to find a FEATURE_START point 38 where the attenuation measured by that detector element exhibits a significant rise and FEATURE_STOP point where the attenuation exhibits a significant drop. Again, although not illustrated, there may be one or more overlapping other objects seen by detector element 36, in which case there would be other pairs of points nested with points 38 and 40. While a number of different ways can be used to find significant rises and drops of attenuation, such as a process involving the regions and clumps described elsewhere, the process should be sufficiently robust so that it does not miss too many entries and exits from objects and yet does not produce too many feature points or outlines which do not correspond to object boundaries but result from spurious variations in attenuation.

The process identifies and records each feature point by its position (e.g., view, detector element and scan line) and finds and records a number of attributes for each feature point, such as type (e.g., FEATURE_BEGIN), Alpha, Boron Background (average boron of the points in a convolution area around the feature point which have below average B values), Iron background (average iron of the points in a convolution area around the feature point which have below average I values), Boron average (average of the boron values in the convolution area), Iron average (average of the iron values in the convolution area), Wireness (a measure of how much the feature around the feature point appears to be a wire), Massness (a measure of how much the feature appears to be at the edge of a massive object), Tail along the scan line (discussed further below) and Tail along the detector element (also discussed further below), pointer to a feature point chain, etc.

The process finds for each feature point, a scan line Tail, which is a line segment extending along the scan line from FEATURE_BEGIN point and across any significant mass to a FEATURE_END point that is close in attenuation to that at the FEATURE_BEGIN point, and a detector element Tail, which is a similar line extending from a FEATURE_START point across any significant mass to a FEATURE_STOP point.

Figure 6:
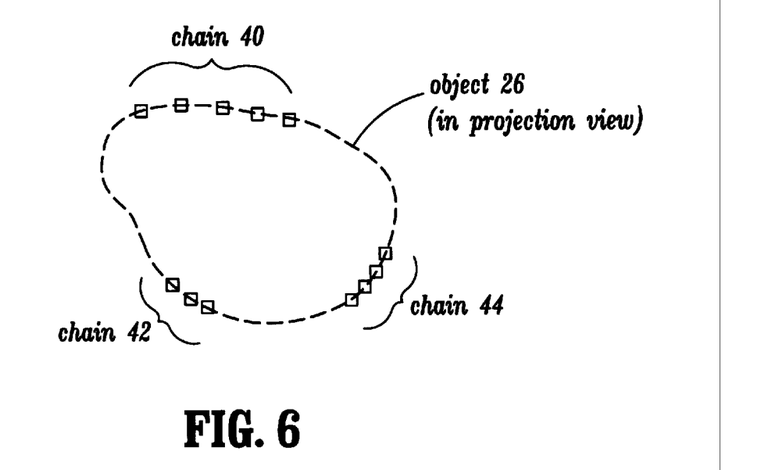
FIG. 6 illustrates chains of feature points in a projection view.

Having found feature points and their attributes, the process attempts to chain feature points within each respective projection view into likely outlines of the projections of likely objects in that projection view, so that this information can be used later for identifying three-dimensional boundaries of likely objects. For this purpose, the process looks for feature points of compatible types and attributes to form chains of such points, and stores for each chain the identity of a first and last detector, a first and last scan line, a view, and the feature points in the chain. FIG. 6 illustrates such chains 40, 42 and 44. In this process, each feature point in a projection view is scored against each chain in the same view to obtain a measure of which, if any, chain it is likely to belong. The score is based on type and attributes similarity, and also on geometric factors such as distance from the point to a chain. A point which is not close to any existing chain starts a new chain. This part of the process should combine into a chain only feature points that match so closely that they are reasonably likely to belong together because they outline the projection view of an object in the bag, and the process should err on the side of not including a point in a chain in case of doubt.

Figure 7:
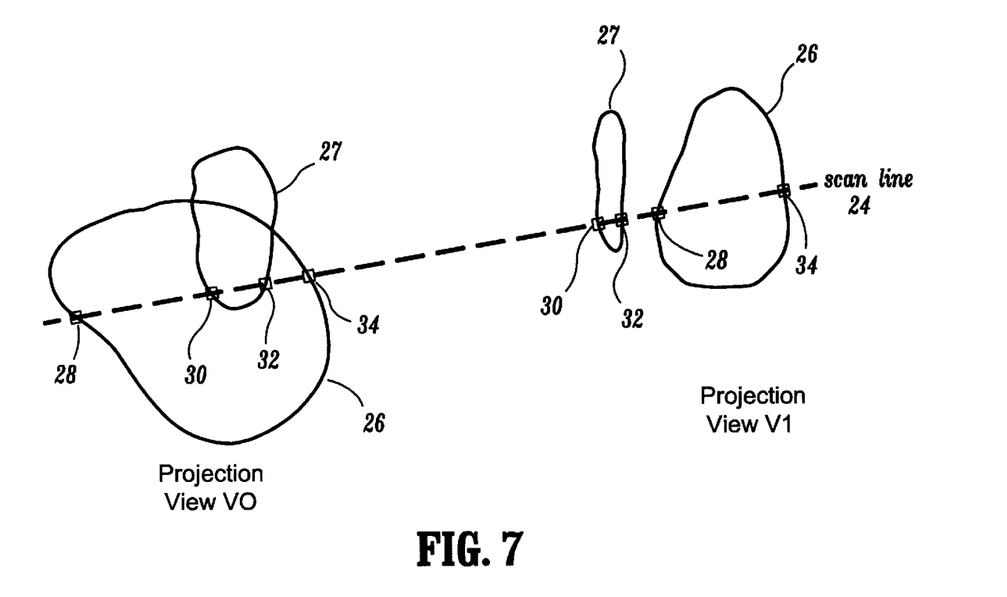
FIG. 7 illustrates projections of two objects in two different projection views.

Having identified feature points and chains in each of the projection views, the process attempts to find tuples, which are points in three-dimensional space that are likely to be at the boundaries of likely three-dimensional objects. To this end, the process examines two projection views at a time to try to identify for each feature point in one view a likely matching feature point in the other projection view. Referring to FIG. 7 for an illustrative example, objects 26 and 27 are seen in two different projection views, V0 and V1, where, as typical, they have different shapes and different relative positions. The purpose of this stage of the process is to find and match with each other point 28 in view V0 and point 28 in view V1, etc. A feature point on a given scan line in one projection view should be matched with a feature point on the same scan line in another projection view. One example of this stage of the process is to match FEATURE_BEGIN points in view V0 against FEATURE_BEGIN points in view V1, then match FEATURE_BEGIN points in view V1 against FEATURE_BEGIN points in view V2, then match FEATURE_END points in view V0 against FEATURE_END points in V1, then match FEATURE_END points in view V1 against FEATURE_END points in view V2, then match FEATURE_BEGIN points in view V0 against FEATURE_END points in view V2, then match FEATURE_END points in view V0 against FEATURE_BEGIN points in view V2. Similar matching can be carried out for FEATURE_START and FEATURE_STOP points instead of, or as a way to refine and improve the results of, matching FEATURE_BEGIN and FEATURE_END points. The feature point with the largest Tail mass can be processed first, by attempting to find its closest match, then the points with the next largest Tail mass is processed, etc. In this context, Tail mass refers to the excess mass over background summed over the pixels in the tail. As with the chains of feature points, the matching process relies on similarities between feature point attributes and geometry. The information identifying chains of feature points can be used to guide and refine the process of tuple identification. The result of this stage of the process is to identify and store tuples by their x,y,z (or other) coordinates in 3D space and by tuple attributes such as a delta Boron value, as well as pointers to the feature points that generated the tuple (and thus to the attributes of these feature points), a pointer to a tuple chain (if any) to which the tuple will be eventually assigned and a pointer to a 3D shape (if any) that can be used to graphically represent the object to which the tuple will be eventually assigned. This stage of the process eliminates any computed tuples that would be outside the bag (the dimensions and geometry of the bag relative to the scan lines can be determined as in said Vivid patents incorporated by reference herein).

After identifying tuples, the process attaches polygons determined by the two tails for each tuple. These polygons represent a known outer extent of the object, given the two matched views and the tails of the tuples. The process then attempts to assign tuples to chains in which the tuples have compatible attributes and geometries such that a tuple chain would represent the likely outline (skeleton) of a likely object in the bag, this time in each slice view rather than in projection views. A slice view is a view which is transverse (e.g., normal) to the direction of travel of the bags through the x-ray beams, and is made up of all of the measurements in three scan lines, one from each of the projection views, which conform to the same plane through the bag.

Figure 8:
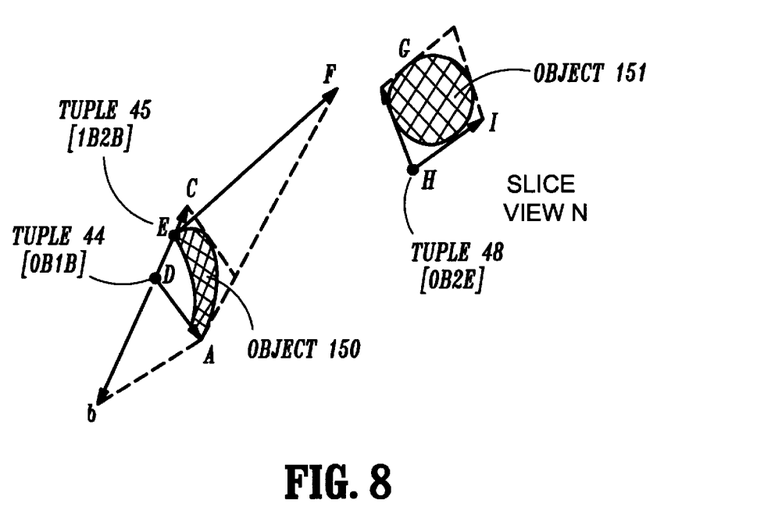
FIG. 8 illustrates chains of tuples.

FIG. 8 illustrates a slice view N of a bag containing two objects, 150 and 151. Three tuples are shown, at 44, 45 and 48, with attached polygons created from the feature point tails. These polygons encompass the objects 150 and 151 that are in this slice view N, since the feature point tail in each view overlaps the object in that view. The tuples shown in FIG. 8 are of three different types and will belong to three different tuple chains, as each tuple chain consists of one type of tuples. For example, tuple 44 is to type View 0 FEATURE_BEGIN & View 1 FEATURE_BEGIN (0B1B), and consists of rays AB and BC. Tuple 45 is of the type View 1 FEATURE_BEGIN & View 2 FEATURE_BEGIN (1B2B), and consists of rays DE and EF. Tuple 48 is is of the type View 0 FEATURE_BEGIN & View 2 FEATURE_END (0B2E), and consists of raysGH and HI. Tuples 44 and 45 overay the same object 150 while tuple 48 overaly a different object 151. In an adjacent slice view, different tuples of the same type on the same objects should belong to the same tuple chains.

For each tuple chain, the process identifies and stores the attributes including (but not necessarily limited to): a first and last x, y, and z; a Delta Boron value; a total Alpha value; a list of tuples which belong to the chain, an array of polygons (explained below); and a pointer to a skeleton (if any) to which the chain will be ultimately assigned. A skeleton is a tuple chain that represents an outline of an object in 3D space. As with feature point chains, tuple chains are created by scoring each tuple against all existing chains of tuples in each slice view. If the score satisfies a threshold, the tuple is assigned to the chain that best matches it; otherwise the tuple seeds a new chain. Again, the score is based on compatible attributes and geometries. After all the tuple chains have been created for a bag, the process attempts to coalesce chains which appear to be extensions of each other, so as to allow chains to jump across small gaps. After chains have been coalesced, they are interpolated to fill small gaps with interpolated tuples having associated attributes.

Figure 9:
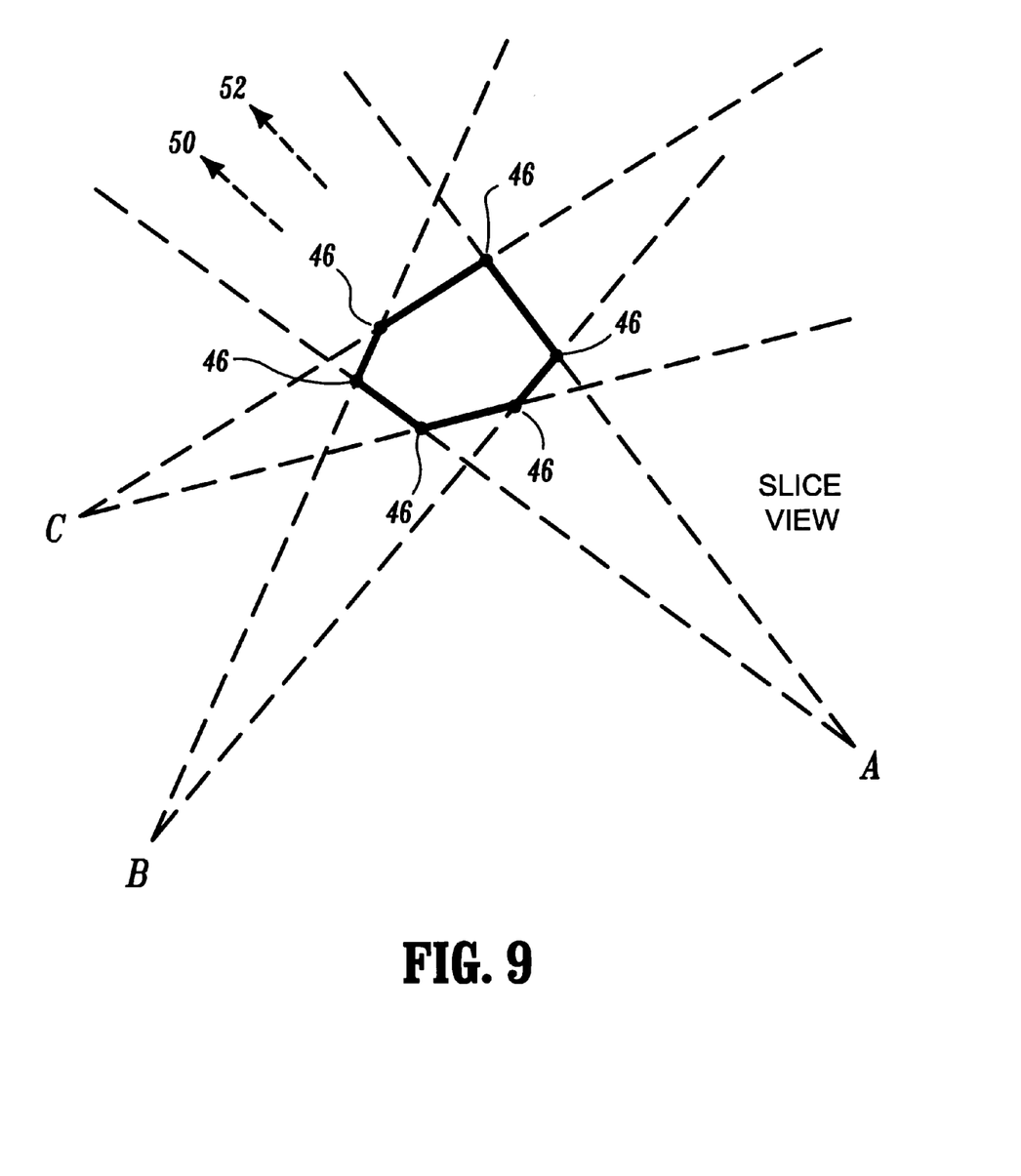
FIG. 9 illustrates forming a polygon bounding a tuple chain.

The process attaches polygons to each tuple chain, where each polygon is bound by two rays from each of the three x-ray sources as illustrated in FIG. 9, where two rays from each of sources A, B, and C bound the tuple chain formed by tuples 46. The rays, illustrated in dotted lines, form the six-sided polygon illustrated in solid lines. In order to refine the shape of the polygon, the process makes use of information regarding the attenuation of rays which pass through the likely object that the polygon represents at that stage. While it is possible to use the attenuation measured for each such ray, processing time can be reduced while still achieving a satisfactory result by using only some of the possible rays and interpolating the rest. Thus, one or a few of the rays passing through the polygon within each of the three x-ray beams can be used for this purpose, for example the two rays positioned uniformly in angle between the two bounding rays for each of the beams, such as rays 50 and 52 for the beam from source A, or a similar pair of rays for any of sources B and C. The segments of these intermediate rays which are within the polygon are called tines. Because each ray that includes a tine has an measured attenuation (a value point in a scan line) and the lengths of the tines can be computed from an estimated polygon at that scan line and from an estimated density, the tine lengths and positions are compared with the measured attenuation values for the respective corresponding rays, and the tines are adjusted in length, density, and position to better match the measured attenuation values in all views. The adjustments are carried out iteratively until a selected threshold of agreement is reached, and this is done for each tuple chain in each slice view.

Figure 10:
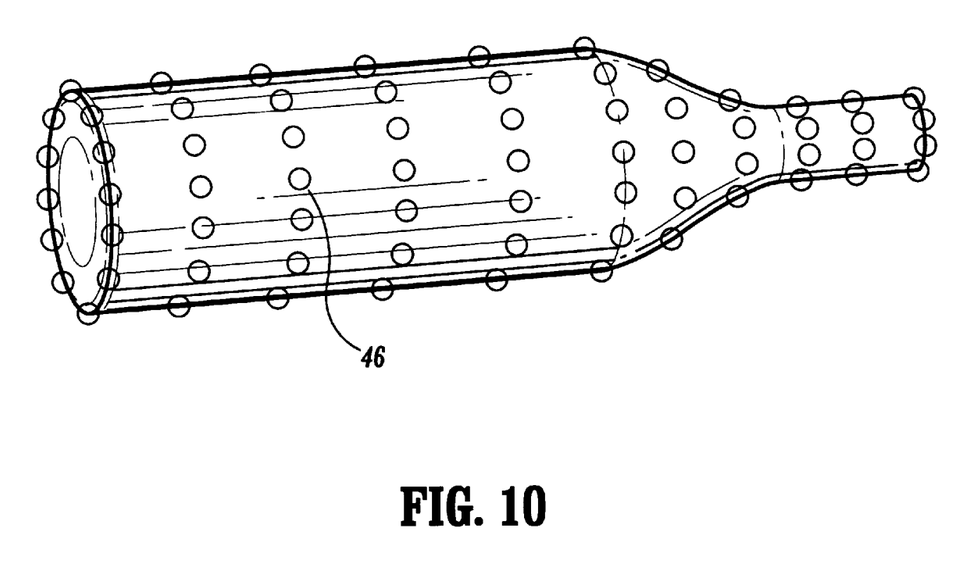
FIG. 10 illustrates a 3D skeleton outlining a likely object in 3D space.

The polygons which have been refined in this manner are used to form a skeleton of a likely object in three dimensional space in the bag, where each skeleton combines tuple chains from a number of slice views and represents the 3D shape of a likely object, as illustrated in FIG. 10, where tuples 46 outline a bottle-shaped likely object.

After forming skeletons representative of the 3D outlines of individual 3D objects, the process calculates digital estimates related to atomic number ($Z_{eff}$, or alpha) and related to mass density of each individual 3D object. For each skeleton remaining at this stage (at the 3D outline of an individual object in the bag), the process estimates an effective atomic number by finding the ratio $\{(I)/(B+I)\}$, where I is the Iron value and B is the Boron value for each of the pixels in the three projection views matching the location of the skeleton, averages the results from the two projection views which are closest to each other and discards the result for the remaining projection view, to thereby produce an estimated atomic number for that likely object. To improve reliability, the averaging can be suitably weighted and outlying values that are substantially different from the bulk of the values can be discarded. To estimate the mass (electron) density of a likely object, for each scan line through the object in each of the three projection views, the process calculates the value $\{B_{object+background} - B_{background})/\text{length}\}$, where the meaning of each term in the expression is the same as discussed earlier in this disclosure for the same expression.

As earlier discussed, an alternative to finding and chaining feature points is the region-by-region processing that finds regions and clumps of regions of like points to arrive at the outlines of likely objects in the bag and to proceed from there to finding and using three-dimensional outlines of likely objects in the bag and then to use the polygon shape refining process described elsewhere in this disclosure.

Figure 11:
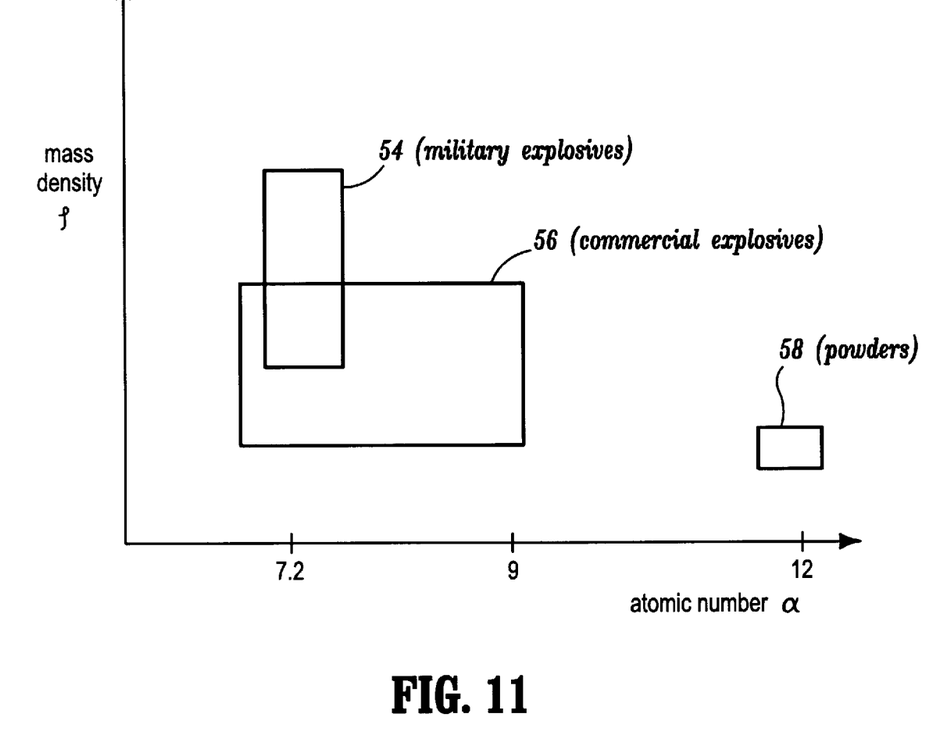
FIG. 11 illustrates a multidimensional space with windows representing exemplary contraband materials.

Each object's $Z_{eff}$ (or alpha) and mass density estimates are tested against windows in multi-dimensional space which correspond to specified contraband materials to check for the presence of such materials in the bag. FIG. 11 illustrates a non-limiting example where two of the axes in multidimensional space are alpha (or $Z_{eff}$) and mass density, and three exemplary windows are illustrated, namely, window 54 for military explosives, window 56 for commercial explosives and window 58 for powder. While the illustrated windows are rectangular, this need not be the case and a window can have any suitable shape that delineates ranges of values associated with contraband. In addition, more dimensions can be used for other characteristics of contraband and matching measurements or estimates for the likely 3D objects in the bag, to thereby define windows that have more than two dimensions. Additional characteristics can be derived from shape, edge qualities, and other image properties from each of the views.

Figure 12:
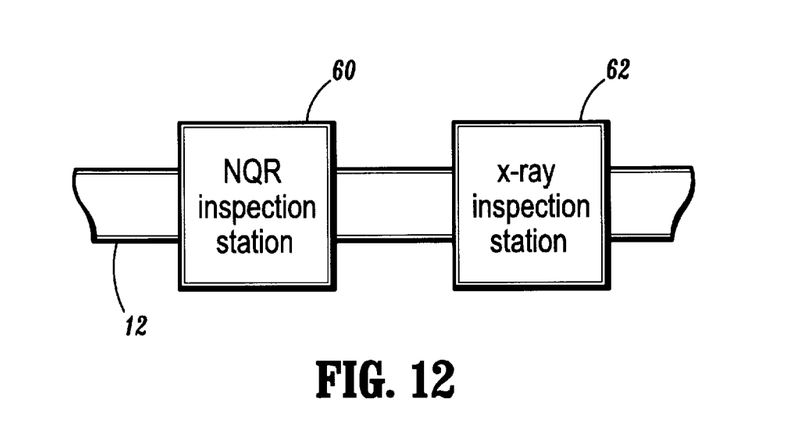
FIG. 12 illustrates the combination of two inspection stations, one using NQR and the other x-rays.

Still in addition, scattered radiation can be measured, for example as discussed in Vivid U.S. Pat. No. 5,600,700 as an aid to finding suspicious bags that are likely to contain contraband. Still in addition, or instead, a modality such as Nuclear Quadrupole Resonance (NQR) can be used as an aid to identify suspicious bags. For example, as illustrated in FIG. 12, conveyor belt 12 can move the bags through an NQR inspection station 60, operating as described in the earlier-cited NQR patents incorporated by reference herein, as well as through an x-ray inspection station 62 operating, for example, as discussed in detail above for the system illustrated in FIG. 1. Alternatively, the bags can be fed to the NQR and x-ray inspection stations by separate bag delivery systems, or the NQR and x-ray inspection stations can be incorporated in the same physical unit and share components. The information from the NQR station (and/or some other inspection modality) can be used as one or more of the dimensions in the multi-dimensional windows of the type illustrated in FIG. 11. The system can estimate the size of the bag, for example by using the three projection views or by using an optical system, and can use the size information to refine the estimates used for feature points and tuples (or regions and clumps) and, ultimately, for checking for contraband.

What is claimed is:

1. A multi view x-ray baggage inspection method for detecting contraband in baggage comprising:

moving baggage through at least three differently oriented x-ray beams which are spaced from each other in the direction of baggage movement through a tunnel having sides, said beams emanating from respective x-ray sources, each pair of sources being spaced from each other by at least a major portion of a side of the tunnel;

deriving dual energy digital x-ray data related to interactions between the baggage and the three x-ray beams;

processing the x-ray data with a computer to identify likely individual objects in the baggage and to produce digital estimates related to effective atomic number and digital estimates related to mass density of the likely objects; and finding the likely presence of contraband in the baggage by testing the estimates relative to multi-dimensional space in which one dimension relates to density and another to effective atomic number.

2. A method as in claim 1 in which said moving comprises moving the baggage through three stationary x-ray beams.

3. A method as in claim 2 in which said moving comprises moving the baggage solely in a translational motion through the three stationary x-ray beams.

4. A method as in claim 3 in which said deriving comprises deriving dual energy x-ray data for each of said three x-ray beams.

5. A method as in claim 4 in which said deriving comprises deriving x-ray data forming three respective projection views of the baggage, one for each of the three stationary x-ray beams.

6. A method as in claim 5 in which said processing comprises identifying, in each of the three projection views, feature points or regions which are likely to conform to edges of the likely objects.

7. A method as in claim 6 in which said processing comprises finding properties of said feature points or regions.

8. A multi view x-ray baggage inspection method for detecting contraband in baggage comprising:

moving baggage through at least three differently oriented x-ray beams which are spaced from each other in the direction of baggage movement;

deriving dual energy digital x-ray data related to interactions between the baggage and the three x-ray beams;

processing the x-ray data with a computer to identify likely individual objects in the baggage and to produce digital estimates related to effective atomic number and digital estimates related to mass density of the likely objects; and finding the likely presence of contraband in the baggage by testing the estimates relative to multi-dimensional space in which one dimension relates to density and another to effective atomic number;

in which said processing comprises finding any tails of said feature points in a first direction which is transverse to the direction of baggage movement as well as in a second direction which is transverse to the first direction.

9. A method as in claim 8 in which said processing comprises chaining feature points or aggregating regions having compatible properties into likely two-dimensional outlines of likely objects in each of said projection views.

10. A method as in claim 9 in which said processing comprises identifying tuples having three-dimensional properties by matching said two dimensional outlines of likely objects in different projection views.

11. A method as in claim 10 in which said identifying of tuples comprises selecting tuples based on pairs of feature points which are from respective pairs of the two-dimensional outlines and meet selected criteria for matching.

12. A method as in claim 11 in which said processing comprises chaining tuples into likely three-dimensional outlines of likely objects.

13. A method as in claim 12 in which said chaining of tuples comprises forming a tuple chain for each likely object from each of a number of different slice views.

14. A method as in claim 13 in which said step of chaining tuples comprises using attributes of a tuple to form a polygon oriented transversely to the direction of baggage movement, said polygon matching a current estimate of the likely outer boundary of a likely object, and repeating for other tuples which are likely to belong to the same object.

15. A method as in claim 14 in which said processing comprises adjusting the shape of the polygon based on information from said projection views.

16. A method as in claim 15 in which said adjusting comprises adjusting the positions of a subset of vertices of a polygon from the same likely object in accordance with measurements for projection views, and adjusting the positions of other vertices for the same likely object based on adjusted positions of said subset of vertices.

17. A method as in claim 16 in which said finding the likely presence of contraband in the baggage comprises estimating average effective atomic numbers and average density for the likely objects in three-dimensional space in the baggage, and matching the estimates for the respective likely objects with windows in multi-dimensional space defined by at least effective atomic number and by density.

18. A method as in claim 17 including estimating dimensions of the baggage, and wherein the chaining of feature points and of tuples or aggregates of regions comprises taking into account said estimated dimensions.

19. A method as in claim 18 in which the producing of digital estimates related to mass density of a likely object comprises basing the estimates on measurements in the three projection views for positions of the vertices of polygons forming the likely three-dimensional outline of the object.

20. A method as in claim 19 in which additional image properties area used for the classifying of objects as contraband.

21. A method as in claim 1 including subjecting the baggage to NQR inspection and using results of the NQR inspection to facilitate detection of contraband in the baggage.

22. A method as in claim 21 in which the processing further comprises processing of data derived from the NQR inspection and the finding of the likely presence of contraband comprises including estimates derived from said processing of data derived from the NQR inspection in said multi-dimensional space.

23. An x-ray baggage inspection method comprising:
   moving baggage through at least three differently oriented, stationary fan-shaped x-ray beams which are parallel to each other;
   deriving dual energy digital x-ray data related to interactions between the baggage and the x-ray beams;
   computer-processing the x-ray data to identify likely three-dimensional individual objects in the baggage and to produce digital estimates related at least to effective atomic number and to mass density of the likely objects; and
   finding the presence of likely contraband in the baggage by testing the estimates related at least to effective atomic number and mass to density of the likely individual objects in the baggage relative to multi-dimensional space in which density is one dimension and effective atomic number is another dimension.

24. A method as in claim 23 in which said moving comprises moving the baggage through only three x-ray beams.

25. A method as in claim 24 in which said moving comprises moving the baggage through the x-ray beams solely in translational motion relative to the beams.

26. A method as in claim 23 including deriving measurements from the baggage by a modality other than x-rays and using said measurements to facilitate the finding of likely contraband.

27. A method as in claim 26 in which said measurements are non-optical measurements.

* * * * *